(12) United States Patent
Koslow

(10) Patent No.: US 9,879,120 B2
(45) Date of Patent: Jan. 30, 2018

(54) RESIN FOR PRECIPITATION OF MINERALS AND SALTS, METHODS OF MANUFACTURE AND USES THEREOF

(75) Inventor: Evan E. Koslow, Kitchener (CA)

(73) Assignee: WATTS REGULATOR CO., North Andover, MA (US)

( * ) Notice: Subject to any disclaimer, the term of this patent is extended or adjusted under 35 U.S.C. 154(b) by 1155 days.

(21) Appl. No.: 13/266,380

(22) PCT Filed: Apr. 27, 2009

(86) PCT No.: PCT/CA2009/000554
§ 371 (c)(1),
(2), (4) Date: May 9, 2012

(87) PCT Pub. No.: WO2010/124354
PCT Pub. Date: Nov. 4, 2010

(65) Prior Publication Data
US 2012/0211419 A1 Aug. 23, 2012

(51) Int. Cl.
*C02F 1/42* (2006.01)
*C08J 3/07* (2006.01)
*B01J 39/18* (2017.01)
*B01J 39/07* (2017.01)
*B01J 47/016* (2017.01)

(52) U.S. Cl.
CPC ............... *C08J 3/07* (2013.01); *B01J 39/07* (2017.01); *B01J 39/18* (2013.01); *B01J 47/016* (2017.01)

(58) Field of Classification Search
CPC .................................................. B01J 39/046
USPC .......................... 210/638, 681, 687; 521/30
See application file for complete search history.

(56) References Cited

U.S. PATENT DOCUMENTS

| | | | | |
|---|---|---|---|---|
| 2,794,777 A | * | 6/1957 | Pearson | 210/669 |
| 2,937,959 A | * | 5/1960 | Reents | C13B 35/06 |
| | | | | 127/46.3 |
| 3,493,498 A | * | 2/1970 | Abrams | B01J 39/046 |
| | | | | 210/673 |
| 3,911,015 A | * | 10/1975 | Andrisano | A61K 31/135 |
| | | | | 564/341 |

(Continued)

FOREIGN PATENT DOCUMENTS

| | | | | |
|---|---|---|---|---|
| DE | 2726665 | * | 1/1979 | B01J 49/00 |
| DE | 2726665 A | * | 1/1979 | |

(Continued)

OTHER PUBLICATIONS

Research Disclosure ("Converting hydrogen ion forms of cation exchange resins to the calcium form—by treating with calcium chloride soln", NPL) Date: Sep. 1994.*

(Continued)

*Primary Examiner* — Patrick J Orme
(74) *Attorney, Agent, or Firm* — Finnegan, Henderson, Farabow, Garrett & Dunner LLP

(57) ABSTRACT

A method of producing a scale-control resin including combining in an aqueous solution a cation-exchange resin and a weak-acid anion mineral or salt having a multivalent cation to allow ion exchange between the resin and the multivalent cation. The cation-exchange resin may be a weak-acid ion exchange resin. The method may further include adding a strong-acid salt having the same multivalent cation as the weak-acid anion mineral or salt to the aqueous solution.

32 Claims, 5 Drawing Sheets

(56) References Cited

U.S. PATENT DOCUMENTS

| | | | | |
|---|---|---|---|---|
| 4,161,446 A | * | 7/1979 | Coillet | B01D 61/025 210/181 |
| 4,299,809 A | * | 11/1981 | Teyssier | B01J 8/02 422/242 |
| 5,000,856 A | * | 3/1991 | Chen et al. | 210/699 |
| 6,080,315 A | * | 6/2000 | Hagen | B01J 39/046 210/638 |
| 6,593,379 B1 | * | 7/2003 | Leiter | B01J 39/046 210/670 |
| 6,600,167 B2 | | 7/2003 | Sano | |
| 6,660,167 B1 | * | 12/2003 | Walder | C02F 1/42 210/714 |
| 6,929,749 B2 | * | 8/2005 | Duke | C23F 15/00 159/47.1 |
| 2005/0145572 A1 | * | 7/2005 | Jangbarwala | B01D 15/362 210/670 |

FOREIGN PATENT DOCUMENTS

| | | | | |
|---|---|---|---|---|
| FR | 2844151 A1 | * | 3/2004 | |
| JP | 58216775 A | * | 12/1983 | |
| JP | 2001079553 | * | 3/2001 | C02F 1/469 |
| JP | 2001079553 A | * | 3/2001 | |

OTHER PUBLICATIONS

Machine translation of DE2726665 Date: Jan. 1979.*
Machine translation of JP2001079553 Date: Mar. 2001.*
"Converting hydrogen ion forms of cation echange resins to the calcium form—by treating with calcium chloride soln", Sep. 10, 1994.
International Search Report from PCT/CA2009/000554, dated Dec. 22, 2009.

* cited by examiner

RESIN FOR PRECIPITATION OF MINERALS AND SALTS, METHODS OF MANUFACTURE AND USES THEREOF

CROSS-REFERENCE TO RELATED APPLICATION

This application is the U.S. national phase, pursuant to 35 U.S.C. §371, of international application No. PCT/CA2009/000554, published in English on Nov. 4, 2010 as international publication No. WO 2010/124354 A1, the disclosure of which application is incorporated herein in its entirety by this reference.

TECHNICAL FIELD

The embodiments disclosed herein relate to scale-control resins for the precipitation of minerals or salts from a solution, and in particular to scale-control resins for removal of scale-forming calcium and magnesium-based minerals or salts from a solution through ion exchange.

INTRODUCTION

It is a common requirement to control the formation of scale on heating and chilling equipment. Such scale is typically the product of excessive levels of calcium salts and hardness in a water supply. During heating or cooling, these minerals tend to form a coating on heat exchanging or other nearby surfaces that reduces the efficiency of heat exchange across these surfaces and result in the fouling and sometimes complete failure of machinery and equipment.

To control scale formation, it has been common practice to carry out water softening, which involves the exchange of calcium and other multivalent ions for a non-scaling ion, such as sodium or potassium. Water softening may be carried out using sodium or potassium-functionalized ion-exchange resins. These sodium or potassium-functionalized resins, once they have become saturated with multivalent ions, may be regenerated using a concentrated brine of sodium or potassium salt.

One problem with water softening is the release of sodium-rich water to downstream water treatment plants and its relative expense and inconvenience. It would be advantageous if the scale-forming minerals could harmlessly pass through process equipment without the need to continuously provide mono-valent salts and the use of relatively complex water softening systems.

One such solution involves the use of a resin that causes hardness minerals to precipitate out of solution prior to encountering critical process equipment so that the fine precipitated minerals pass through the equipment without coating critical surfaces and forming hard scale.

Leiter and Walder (U.S. Pat. No. 6,593,379) describe a method for converting a weak acid ion exchanger material from the H form into the Ca form wherein calcium hydroxide ($Ca(OH)_2$)) is reacted with a hydrogen-form weak-acid resin. However, strongly alkaline ingredients such as calcium hydroxide are hazardous, expensive and difficult to handle.

Leiter and Walder (U.S. Pat. No. 6,600,167) also describe a method for precipitating or flocculating substances out of a basic solution with a resin through catalysis without exchange of the counter ions on the resin for ions contained in the solution.

There remains a need for improved resins and methods for removing scale-forming substances from solutions.

SUMMARY

In some embodiments, the present disclosure describes providing scale-control resins suitable for removing scale-forming substances, methods for producing such resins, and uses thereof.

According to some embodiments, a method of producing a scale-control ion exchange resin comprises combining a cation exchange resin with a weak-acid anion mineral or salt comprising a weak-acid anion and a multivalent cation. The production of the scale control resin may further include combining a strong-acid salt having the same multivalent cation as the weak-acid anion mineral or salt with the cation exchange resin.

Additional embodiments of the disclosure include resins produced by the methods described herein. The resins may be useful for the non-catalytic precipitation of scale-forming minerals or salts from solution. Accordingly, a further embodiment provided herein is the use of the resin for precipitating an ionic substance out of solution, wherein ion exchange occurs between the resin and the ionic substance.

The disclosure also provides methods comprising periodically heat-treating the resin in the presence of solution to restore and/or preserve the performance of the scale-control resin. Further embodiments include use of the resin described herein in combination with additional ion-reducing technologies or technologies for removing scale-forming substances from solution.

According to some embodiments, there is provided a method of producing a scale-control resin comprising combining in an aqueous solution a cation-exchange resin and a weak-acid anion mineral or salt having a multivalent cation to allow ion exchange between the resin and the multivalent cation. The cation-exchange resin may in some embodiments be a weak-acid ion exchange resin.

The method may further comprise adding a strong-acid salt having the same multivalent cation as the weak-acid anion mineral or salt to the aqueous solution.

The combination of cation-exchange resin and the weak-acid anion mineral or salt may be heated, in some embodiments to a temperature between 50 and 100° C., and in other embodiments to a temperature between 70 and 90° C.

The method may further comprise drying the scale-control resin to a moisture content selected to increase the scale control efficiency of the scale-control resin. In some embodiments, the scale-control resin is dried to a moisture content of less than 50%. In other embodiments, the scale-control resin is dried to a moisture content of between 5 and 20%.

In some embodiments, the weak-acid anion mineral or salt may comprise calcium carbonate. In other embodiments, the weak-acid anion mineral or salt may comprise aluminum hydroxycarbonate hydrate. In yet other embodiments, the weak-acid anion mineral or salt may comprise an anion selected from the group consisting of carbonate and bicarbonate.

In some embodiments, the strong-acid salt may comprise calcium chloride. In other embodiments, the strong-acid salt may comprise aluminum sulfate. In yet other embodiments, the strong-acid salt may comprise an anion selected from the group consisting of chloride, sulfate, nitrate, bromide, iodide and perchlorate.

In some embodiments, the weak-acid anion mineral or salt is added in stoichiometric excess as compared to the cation-exchange capacity of the cation-exchange resin.

In some embodiments, a less than stoichiometric quantity of the strong-acid salt as compared to the weak-acid anion mineral or salt is added to the aqueous solution. In other embodiments, a less than stoichiometric quantity of the strong-acid salt as compared to the cation-exchange capacity of the cation-exchange resin is added to the aqueous solution.

In some embodiments, the cation-exchange resin may be a hydrogen-functionalized weak-acid ion-exchange resin.

According to another aspect of the invention, there is provided a scale-control ion-exchange resin produced by any one or more of the methods described herein.

According to another aspect of the invention, a scale-control ion-exchange resin produced by any one or more of the methods described herein may be used for precipitating an ionic substance out of a solution wherein ion exchange occurs between the scale-control resin and the solution.

According to yet another aspect of the invention, there is provided a method for precipitating an ionic substance out of solution comprising contacting a scale-control ion-exchange resin produced by any one or more of the methods described herein with a solution wherein precipitation is effected through the exchange of ions between the scale-control resin and the solution.

The method may further comprise periodically heat-treating the scale-control resin. The heat-treating may include rinsing the scale-control resin with hot water. In some embodiments, an immersion heater and timer are used to perform the periodic heat treatment of the scale-control resin.

The method may further comprise the use of at least one additional technology capable of removing multivalent ions from the solution. The additional technology may be downstream from the scale-control resin, and may include reverse osmosis and/or water softening.

In some embodiments, substantially all of the multivalent ions are removed from the solution. In some embodiments, approximately 70% of the multivalent ions are precipitated out of the solution using the scale-control resin prior to the solution contacting the additional technology capable of removing multivalent ions from the solution.

BRIEF DESCRIPTION OF THE DRAWINGS

The drawings included herewith are for illustrating various examples of methods and apparatus of the present specification and are not intended to limit the scope of what is taught in any way. In the drawings.

DETAILED DESCRIPTION

Figure 1:
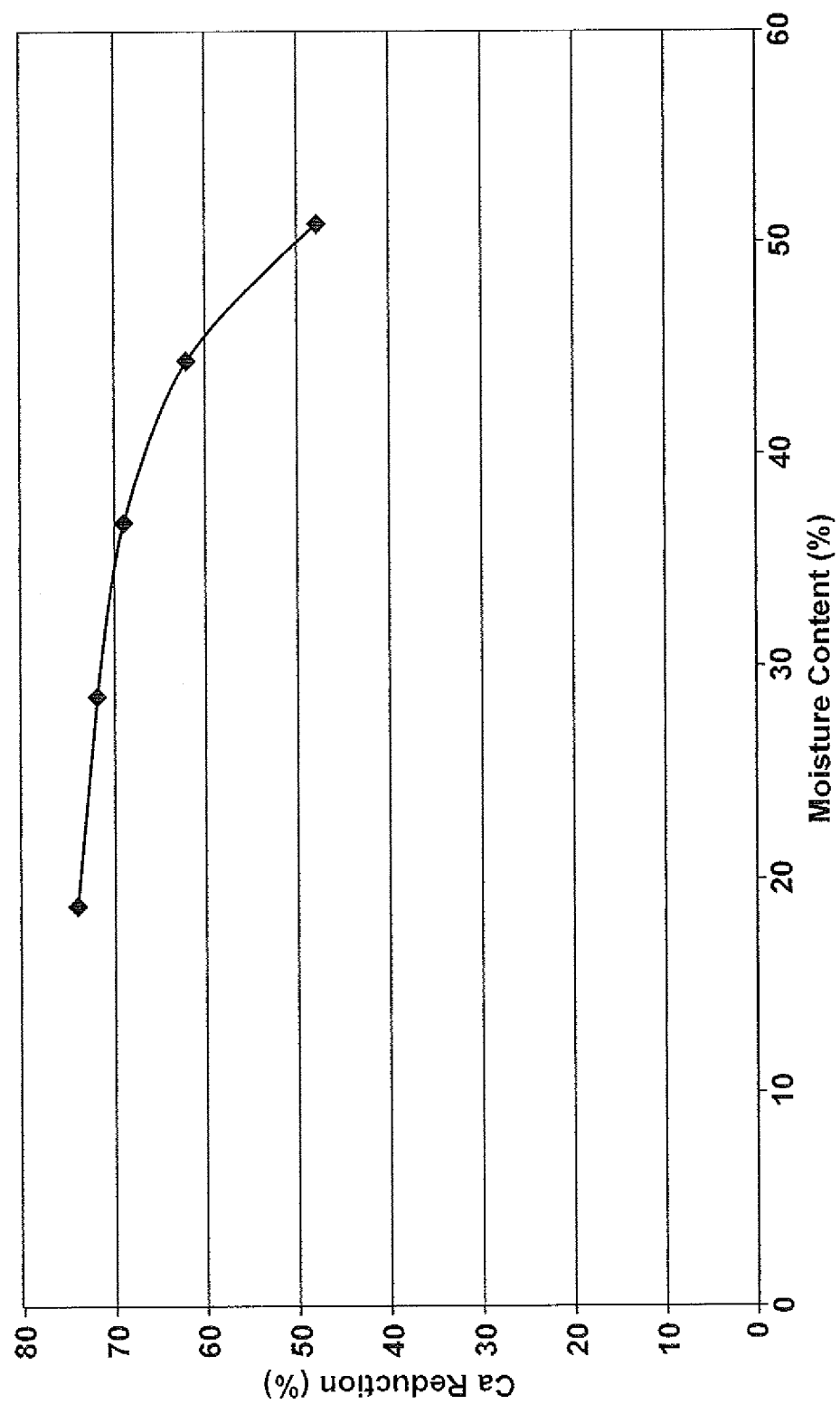
FIG. 1 is a schematic illustration showing the relationship between moisture content of the resin and reduction in calcium levels according to one embodiment.

According to some embodiments, methods of forming scale-control ion exchange resins suitable for the removal of scale-forming ions from solution and uses of such resins are described. More specifically, resins can be produced by combining a suitable starting material ion-exchange resin with a weak-acid anion mineral or salt that contains a suitable multivalent cation.

The resin may also be treated with a relatively small amount of a strong-acid salt comprising the same multivalent cation as the weak-acid anion based mineral or salt such that a high degree of the exchange sites of said resin are filled with the multivalent exchangeable cations. In some cases, heat treatment and drying the resin prior to use may also improve the performance of the resin for removing scale-forming ions from solution.

Generally, the resins as described herein may be produced without the use of harsh alkaline reagents, such as calcium hydroxide. The scale-control resins also exhibit the ability to continuously precipitate scale generally without the requirement to be periodically regenerated.

As shown in Example 5 below, the precipitation of scale by the resin tends to result from ion-exchange at the surface of the resin. Without limiting the scope of the embodiments described herein, it is believed that the precipitate is formed in the electric double layer adjacent to the surface of the resin.

By forming a precipitate within the electric double layer, there tends to be no strong attachment between the resin surface and the resulting precipitate. Accordingly, the precipitate is easily released back into the process liquid as a result of shear, agitation and/or other forces acting on the liquid adjacent to the resin. As such, the resin tends not to be fouled by the formation of scale particles and the resulting particles tend not to become attached to downstream surfaces of critical equipment.

Accordingly, such resins provide "scale-control" through the precipitation of excessive scale-forming ions or minerals into stable particles that no longer have a significant tendency to attach to downstream surfaces.

Methods of Producing Scale-Control Resin

In one embodiment, the production of scale-control resins uses a cation exchange resin as a starting material. In one embodiment the cation exchange resin is a weak-acid ion exchange resin. For example, the starting resin may be a hydrogen-form or mono-valent functionalized weak-acid ion-exchange resin, such as traditional ion-exchange resins used in water softening. In another embodiment, the cation exchange resin may be a strong-acid ion exchange resin.

In one embodiment, the resins may be carboxylic-acid functionalized resins with high available exchange capacity. Resins with a pore structure that promote optimal mass transfer with the surrounding liquid or solution have been found to be particularly effective starting materials.

In one specific embodiment, the resin may be a cation exchange resin such as Lewatit® S 8277.

The starting material resin may then be treated in order to saturate the exchange sites of the resin with multivalent exchangeable cations. While resins produced according to techniques known in the prior art often use cations associated with strong-bases (such as calcium hydroxide), in the present disclosure a weak-acid anion mineral or salt is used to modify a starting cation exchange resin.

As used herein the term "weak-acid anion mineral or salt" generally refers to a substance that comprises a multivalent cation and the conjugate base of a weak-acid. For example, in one embodiment, the weak-acid mineral or salt is calcium carbonate, calcium acetate or aluminum hydroxy-carbonate.

In a further embodiment, the weak-acid anion mineral or salt is the corresponding salt of any weak acid having a pKa greater than about 2. For example, carbonic acid has a pKa of about 3.60 (at STP), and accordingly, calcium carbonate is the salt of the weak acid of carbonic acid. Further weak acids include acetic acid, citric acid, ascorbic acid and the like. Accordingly, the weak-acid anion mineral or salts of these weak acids include calcium acetate, calcium citrate, calcium ascorbate and the like.

According to some embodiments, a further aspect of the disclosure is the use of a promoter comprising a soluble strong-acid salt having the same multivalent cation to promote the exchange of sites on the starting resin with multivalent exchangeable cations.

As used herein the term "strong-acid salt" generally refers to a substance comprising a multivalent cation and a conjugate base of a strong acid. Examples of strong-acid salts include calcium chloride and aluminum sulfate. In another embodiment, the strong-acid salt is the corresponding salt of a strong-acid comprising the conjugate base of a strong-acid and a multivalent cation.

In a further embodiment, the strong acid salt is the corresponding salt of a strong acid, wherein the strong acid has a pKa of between −15 and 1. Examples of strong acids include HCl, $H_2SO_4$, $HNO_3$, HBr, HI and $HClO_4$, and accordingly the strong-acid salts include $CaCl_2$, $CaSO_4$, $Ca(NO_3)_2$, $CaBr_2$, $CaI_2$ and $Ca(ClO_4)_2$.

In one embodiment, the weak-acid anion mineral or salt is added in sufficient quantity to accomplish complete or nearly complete saturation of the starting resin with the new multivalent cation. In one embodiment, the weak-acid anion mineral or salt is added in stoichiometric excess compared to the cation-exchange capacity of the cation exchange resin. Optionally, a smaller amount of a corresponding strong-acid salt that serves as an exchange catalyst or promoter may also be added. In one embodiment, a less than stoichiometric amount of the strong-acid salt compared to the cation-exchange capacity of the cation exchange resin is added. In a further embodiment, a less than stoichiometric amount of the strong-acid salt compared to the weak-acid anion mineral or salt is added.

In one embodiment, greater than 50% of the weak-acid sites on the starting cation exchange resin are exchanged for the multivalent cation. In another embodiment, greater than 70% of the weak-acid sites on the starting cation exchange resin are exchanged for the multivalent cation. In other embodiments, greater than 90%, greater than 95%, or greater than 99% of the weak-acid sites on the starting weak-acid ion exchange resin may be exchanged for the multivalent cation. In some embodiments, close to 100% of the weak-acid sites on the starting cation exchange resin are exchanged for the multivalent cation.

It is generally not necessary that the weak-acid anion mineral or salt is substantially soluble in water. For example, calcium carbonate in the form of precipitated calcite may be an acceptable weak-acid compound.

In some embodiments, a solution containing the starting resin and the weak-acid anion mineral or salt is heated to accelerate and promote the ion-exchange process.

In some embodiments, the weak-acid anion mineral or salt is calcium carbonate, and the corresponding strong-acid salt with the same multivalent cation is calcium chloride. In other embodiments, the weak-acid anion mineral or salt is aluminum hydroxy-carbonate and the corresponding strong-acid salt with the same multivalent cation is aluminum sulfate.

In one embodiment, the presence of the strong-acid salt is believed to promote the process of ion exchange on the resin typically through a series of steps as follows:

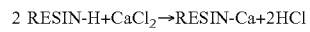

$$2\ RESIN\text{-}H + CaCl_2 \rightarrow RESIN\text{-}Ca + 2HCl$$

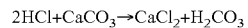

$$2HCl + CaCO_3 \rightarrow CaCl_2 + H_2CO_3$$

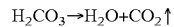

$$H_2CO_3 \rightarrow H_2O + CO_2\uparrow$$

In this embodiment, the hydrogen on the resin tends to react with the multivalent strong-acid salt (e.g. $CaCl_2$) to form a strong acid. This strong acid then reacts with the weak-acid anion mineral or salt (e.g. $CaCO_3$) to regenerate the original strong-acid salt and a corresponding weak acid, such a carbonic acid.

In some embodiments, heating of the reaction mixture may be used to accelerate the reaction, but is generally not required.

The general purpose of the reaction sequence is to cause the reaction to be driven to completion through the reaction of the hydronium ion with a weak acid that suppresses the presence of hydronium ion in the reaction mixture. In this case, if the carbon dioxide gas is allowed to leave the reaction liquid (e.g. in the form of bubbles or otherwise), the "weak acid" formed and remaining during the reaction may be nothing more than water.

One advantageous aspect of the methods provided herein is that they allow the use of weakly alkaline agents, such as calcium carbonate. Strongly alkaline ingredients such as calcium hydroxide are more hazardous to handle and are generally more expensive. Furthermore, the use of a strong-acid salt promoter makes it possible to efficiently utilize a cheaper ingredient, such as calcium carbonate, generally without an attendant loss of reaction speed and productivity.

In some embodiments, the amount of strong-acid salt that is added to the resin is less than the amount of the weak-acid anion mineral or salt. In particular, only a very modest and substantially less than stoichiometric quantity of the strong-acid salt may be provided.

For example, in some embodiments less than $\frac{1}{4}$, $\frac{1}{8}$, $\frac{1}{16}$, $\frac{1}{20}$ or $\frac{1}{32}$ molar equivalents of strong-acid salt relative to the weak-acid anion mineral or salt may be added to the resin. In other embodiments, less than $\frac{1}{50}$, $\frac{1}{100}$, $\frac{1}{250}$, $\frac{1}{500}$ or $\frac{1}{1000}$ of strong-acid salt relative to weak-acid anion mineral or salt may be added to the resin.

In some embodiments, the starting material resin may be suspended, fluidized or provided in a suitable quantity of water or aqueous solution. In some cases, the aqueous solution can be at an elevated temperature such as above 50° C. and less than 100° C. In other cases, the temperature of the aqueous solution can be in the range of 70-90° C.

In some embodiments, in order to prepare the resin the suspended starting resin is combined with a weak-acid anion mineral or salt comprising a multivalent cation such as calcium carbonate. In some embodiments, the resin is also mixed with a strong-acid salt such as calcium chloride. Optionally, the starting resin, weak-acid anion mineral or salt and strong-acid salt may be stirred or agitated when combined to promote mixing. Optionally, the starting resin, weak-acid anion mineral or salt and the strong-acid salt may be heated when combined. In one embodiment the starting resin and weak-acid anion mineral or salt are heated to a temperature above 50° C. and less than 100° C. In other cases, the temperature of the starting resin and weak-acid anion mineral or salt can be heated to a temperature in the range of 70-90° C. In one embodiment the mixture of starting resin, weak-acid anion mineral or salt, and strong-acid salt are allowed to react in order that the functionalized sites in the starting material resin become saturated with the multivalent cation.

In other embodiments, a combination of weakly acidic hydrogen form resin, weak-acid anion mineral or salt, and strong-acid soluble salt is agitated for a sufficient period in a heated reactor to produce a resin that is saturated with the multivalent cation, and where substantially all of the hydrogen-form of the resin has been exchanged with this cation.

Drying the Resin

As shown in Example 4 below, drying the resin tends to greatly improve the formation of a suitable ion exchange product that demonstrates precipitation of scale. For example, FIG. 1 shows the scale-reduction performance of samples of scale-control resin dried to varying levels of residual moisture.

Drying is believed to cause shrinkage of the resin product and in one embodiment it is believed that this causes the carboxylic acid groups and their associated counter-ions to be drawn into a smaller and tighter space. This appears to cause a concentration of these ions and perhaps an irreversible shrinkage of the resin that promotes the precipitation reaction.

Once dried, rewetting of the resin and its use for scale control is possible. In some cases, without this drying step, the resin does not show appreciable or commercially useful amounts of scale control (although it may still provide some scale control).

In some embodiments, following the formation of the multivalent ion functionalized resin, the liquid and any excess of the reactants may be rinsed away to leave wet resin ready for drying.

The resin may then be dried by any one of the methods known in the art. In one embodiment, the resin may be transferred into a heat resistant vessel and placed in an oven at a temperature between 50 and 110° C. for a period of time selected in order to dry the resin to a desired moisture content. In other embodiments, the resin is dried until the moisture content of the resin is less than 50%. In other embodiments, the resin is dried until the moisture content of the resin is less than 40%. In yet other embodiments, the resin is dried to until the moisture content is between 5% and 20%.

The Scale Control Resin Operates Via Cation-Exchange

The present disclosure provides methods of preparing resins useful for the removal of scale-forming ions from solution. The resins produced by these methods are generally not catalytic and do not involve the precipitation of scale-forming ions by a catalytic process. Instead, ions on the surface of the scale-control resin product tend to freely carry out ion exchange with the scale-forming liquid and become incorporated into the resulting precipitated particles.

Figure 2:
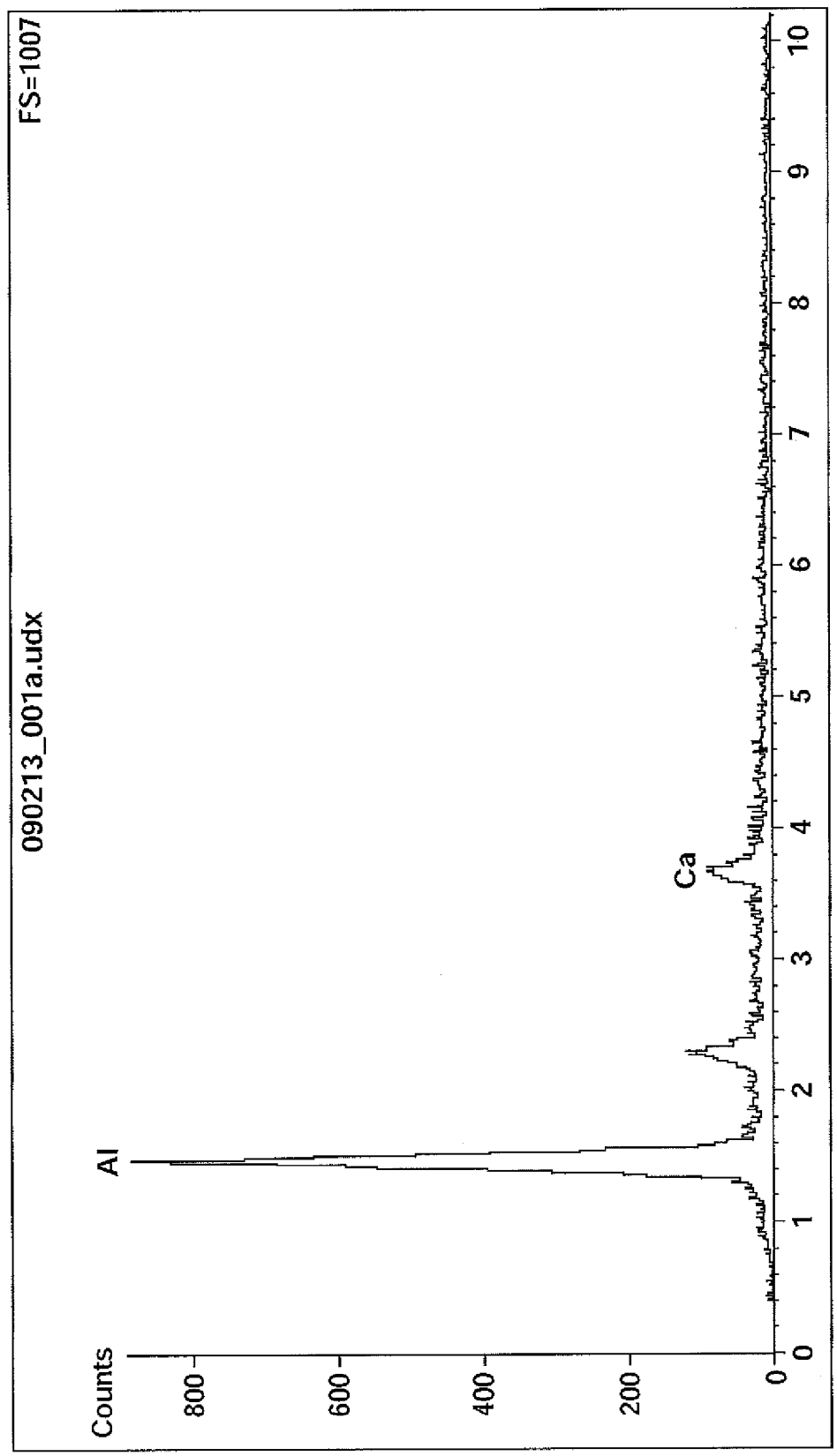
FIG. 2 is an X-ray analysis showing a predominantly aluminum-based precipitate according to Example 5.
Figure 3:
FIG. 3 is a Scanning Electron Micrograph (SEM) of an aluminum-based precipitate according to Example 5.

As shown in Example 5 below, an aluminum-ion functionalized weak-acid resin prepared using the methods described herein was subjected to multiple rounds of scale-control testing with high scale-potential water. The precipitate formed during the first round of testing consisted of particles of aluminum carbonate or aluminum hydroxycarbonate, as generally shown in FIGS. 2 and 3.

Figure 4:
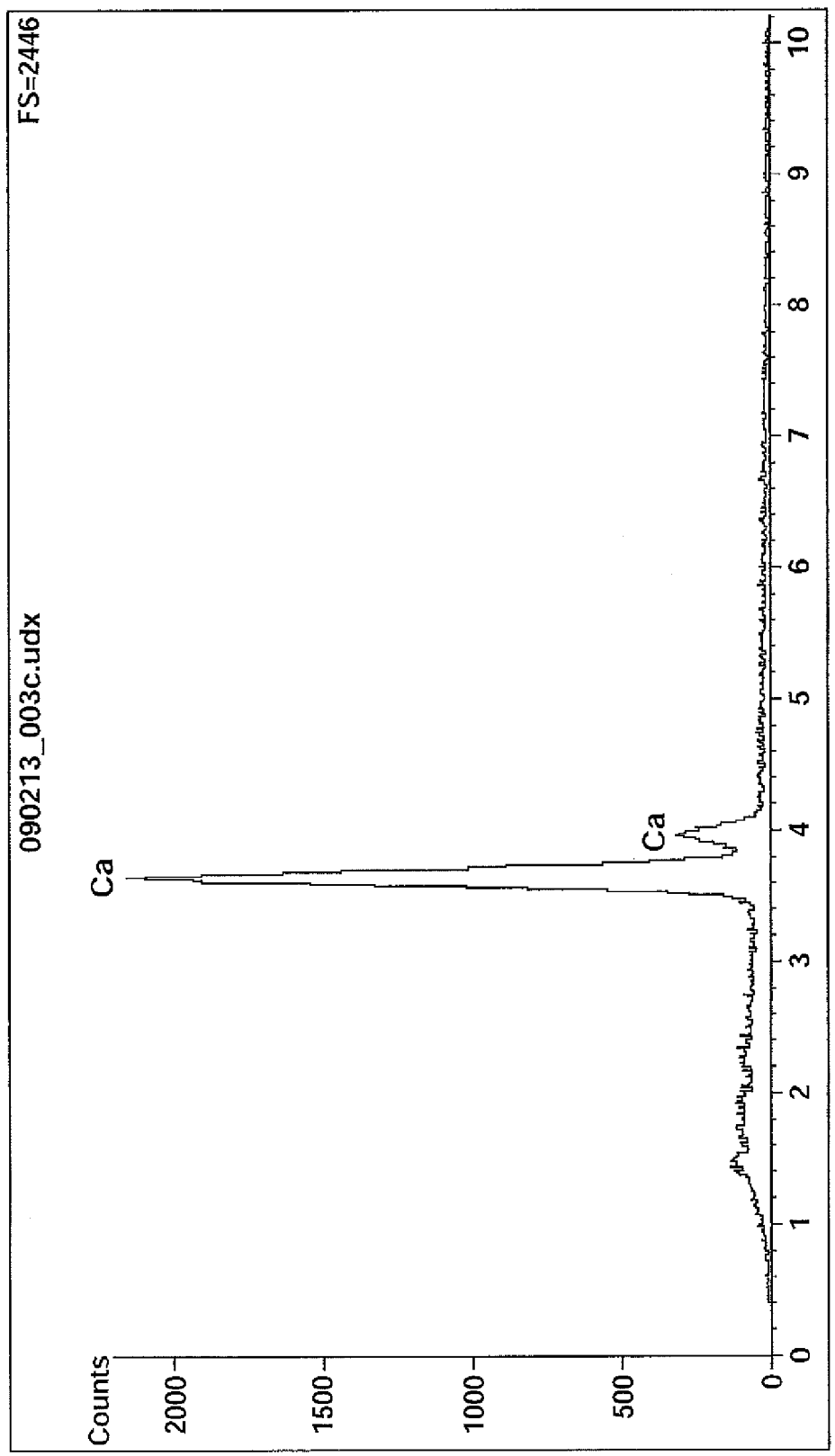
FIG. 4 is an X-ray analysis showing a predominantly calcium-based precipitate according to Example 5.
Figure 5:
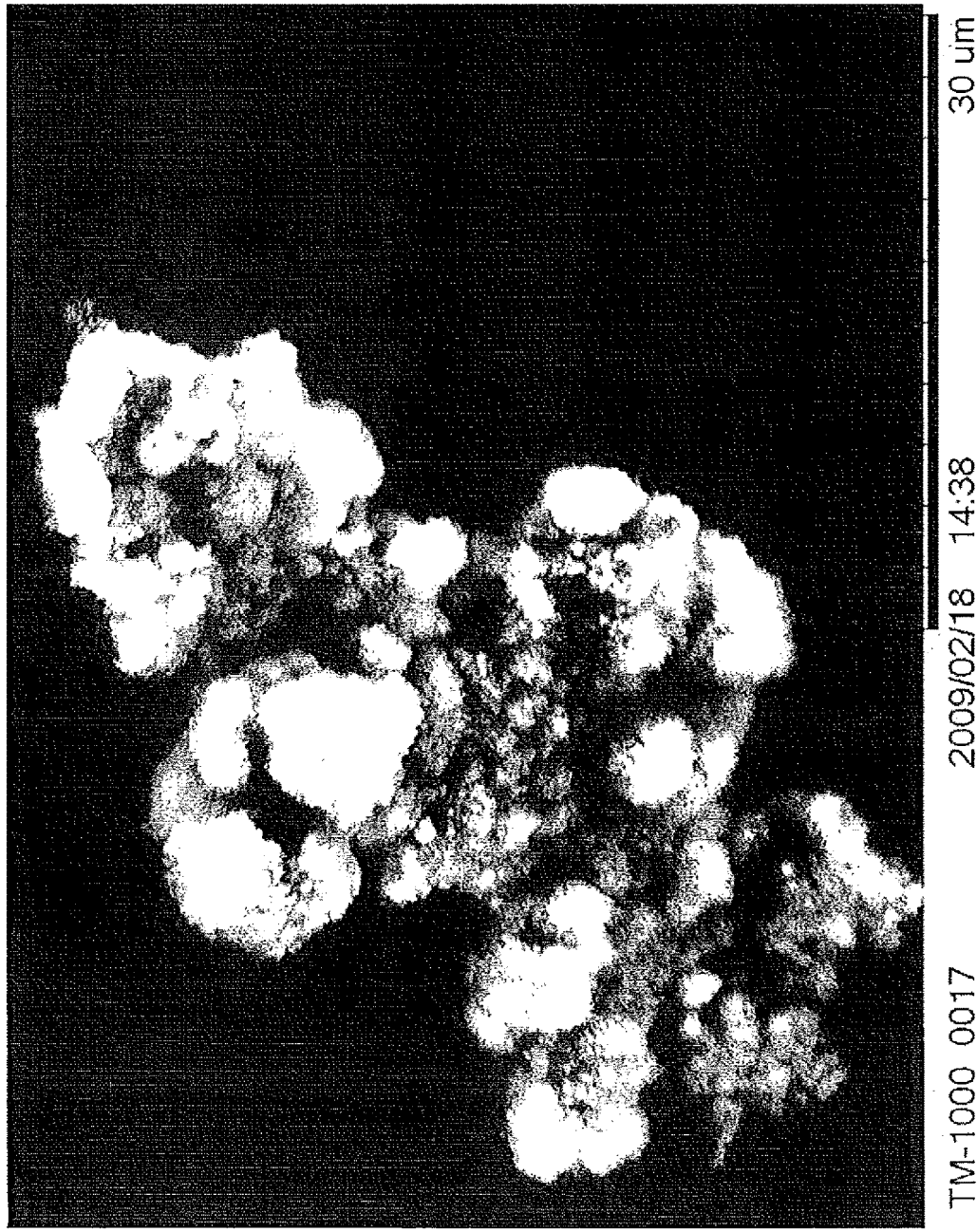
FIG. 5 is a SEM of a calcium-based precipitate according to Example 5.

In subsequent tests using the same initial resin, the observed particles progressively tend to consist of much finer crystals of calcium carbonate, as shown in FIGS. 4 and 5. The transition from the presence of aluminum to that of calcium in the precipitates strongly affirms that the resin operates through actual ion exchange between the resin and the surrounding solution. Resins prepared using the methods described herein, therefore, carry out scale control through ion-exchange and not through a catalytic mechanism.

Use of the Scale-Control Resin in Combination with Other Removal Systems

The scale-control resins, as generally described herein, tend to cause a significant collapse in the quantity of soluble calcium present in the liquid following contact with the resin. As the remainder of the calcium generally assumes the form of small insoluble calcite crystals, it may be advantageous to combine the scale-control resin with additional systems for removing ionic substances from solution, such as using traditional reverse osmosis or water softening equipment. In one embodiment the ionic substances are multivalent ions.

In some embodiments, the additional systems for removing ionic substances are downstream of the scale-control resin. The loading on the downstream equipment for the reduction of residual hardness and soluble ions may thereby be greatly reduced, and the equipment can be significantly reduced in size or operated with reduced requirements for regeneration.

For example, the small calcium carbonate crystals produced by exposure of high scale potential water to the scale-control resin may be ejected with RO brine without significant polarization of the downstream RO membrane.

As a further example, it may be possible to operate a downstream water softener at approximately 30% of its original loading rate when roughly 70% of the incoming calcium is converted to insoluble calcite crystals. This greatly reduces the requirement for salt regeneration and the amount of chloride effluent released during regeneration of the downstream resin bed. In another embodiment, use of the scale-control resin provided herein in combination with other ionic removal systems reduces the load and cost of these downstream systems.

In some embodiments, the scale-control resin, by causing the precipitation of incoming calcium salts that contribute to hardness, may be used in combination with other technologies for removing ionic substances or scale-forming substances.

In some embodiments, the scale-control resin is placed upstream of ion-reduction technologies such as water softeners, or other technologies that are known in the art to remove scale-forming substances from solution. In some cases, such a combination system can achieve nearly 100% ion reduction, for example through an efficient precipitation of around 70% of the incoming calcium using the scale-control resin system and the residual soluble calcium using another ion-reduction technology.

Periodic Heat Treatment of the Scale-Control Resin

Other embodiments as generally provided herein relate to the periodic heat treatment of the scale-control resin. Surprisingly, heat treatment has been shown to restore and/or preserve the performance of the scale-control resins as generally described herein. In one embodiment, the resin may be treated at a temperature of greater than 40° C. in the presence of calcium-rich hard water to restore and/or preserve the performance of the resin for scale control via the desorption of magnesium that has accumulated on the resin. Magnesium is thought to lower the performance of the resin as it accumulates during use of the resin in mixed magnesium and calcium waters.

Heating of the scale-control resin tends to cause the magnesium to increase in solubility as magnesium carbonate solubility increases with temperature. However, the solubility of calcium carbonate tends to decrease with increasing temperature and so the heat treatment causes the equilibrium between magnesium and calcium on the resin to shift in favor of calcium being retained and magnesium being desorbed. Repeated heat treatment will, therefore, tend to preserve the resin's performance for extended periods.

In one embodiment, the scale-control resin may be heated to a temperature between 40° C. and 100° C. In other embodiments, the scale-control resin may be heated to a temperature between 70 and 90° C., and in some cases to about 8° C. Heat treatment of the resin may be conducted according to the operating conditions of the resin to preserve performance.

In some embodiments, the resin may be heated periodically every day, every week, or according to another suitable schedule depending on the properties of the resin system and the operating characteristics of the system. It will be appreciated that the resin should be heated for a period that allows for the desorption of magnesium and the preservation or restoration of the resin to provide for good results.

In some embodiments, the scale-control resin may be treated with a periodic rinse with hot water. In other embodiments, the resin may be heated for a suitable period of time to allow for magnesium desorption.

According to another embodiment, a timer and immersion heater may be used within the resin bed in order to conduct the heat treatment of the resin. It will be also appreciated that operating the scale-control resin at a continuously elevated temperature may tend to reduce and/or prevent the resin from precipitating calcium carbonate.

The above disclosure generally describes embodiments of the present application. Further details may be obtained by reference to the following specific examples. These examples are described solely for the purpose of illustration and are not intended to limit the scope of the disclosure. In particular, changes in form and substitution of equivalents are contemplated as circumstances might suggest or render expedient. Although specific terms have been employed herein, such terms are intended in a descriptive sense and not for purposes of limitation.

EXAMPLES

Example 1: Production of a Calcium-Functionalized Weak-Acid Ion-Exchange Resin

This Example provides a suitable procedure for the production of a calcium-functionalized weak-acid ion-exchange resin.
Materials:
  200 mL Lewatit S8227 ion exchange resin (Lanxess Sybron Chemicals, Inc.)
  ~900 mL reverse osmosis/deionized (RO/DI) water
  25 g calcium carbonate
  2.2 g calcium chloride
Procedure:
1. Place the 200 mL of Lewatit S8227 ion exchange resin in a 1 L beaker. Add a large (2") Teflon-coated magnetic stir bar and fill to the 1000 mL mark with RO/DI water.
2. Place the beaker on a hotplate/stirrer and adjust the mixing speed so that the resin is fully fluidized in the water.
3. Heat the mixture to 80° C. Monitor the temperature with an accurate thermometer and ensure that the temperature stabilizes at 80° C.
4. When the temperature has stabilized, add 25 g of calcium carbonate and 2.2 g of calcium chloride.
5. Allow to react for a minimum of five hours at the elevated temperature.
6. If desired: after five hours, turn off the heat and allow the mixture to cool. Continue stirring. When the beaker is cooled to room temperature, cover it with Parafilm and allow to react overnight at room temperature.
7. When the reaction time is complete, remove the beaker from the stir plate and pour the contents through a basket made from 60 mesh steel screen.
8. Remove the magnetic stir bar and rinse the resin for several minutes with copious RO/DI water.
9. Transfer the resin into a heat-resistant vessel (either glass beaker or aluminum tray) and place in a laboratory oven at 105° C.
10. Dry until the moisture content reaches ~15%, stirring every 15 minutes.

Example 2: Production of an Aluminum-Functionalized Weak-Acid Ion-Exchange Resin This Example provides a suitable procedure for the production of an aluminum-functionalized weak-acid ion-exchange resin
Materials:
  Aluminum sulfate
  Sodium bicarbonate
  Sodium hydroxide
  Lewatit S8227 ion exchange resin
  RO/DI water
Procedure:
1. Prepare aluminum hydroxycarbonate hydrate powder as follows:
  a. Dissolve 116 g of aluminum sulfate in 500 mL RO/DI water.
  b. Dissolve 36.5 g of sodium bicarbonate in 500 mL RO/DI water.
  c. Add the sulfate solution to the bicarbonate solution with stirring in a 1 L beaker. Monitor the pH of the mixture.
  d. Maintain the pH of the mixture in the neutral to weakly alkaline range (between 6.8-7.8) by adding small amounts of 1M sodium hydroxide solution as necessary.
  e. Filter the reaction mixture using a Buchner funnel and Whatman #1 filter paper.
  f. Transfer the filter cake into a heat-resistant vessel and place in the laboratory oven at 80° C.
  g. When the cake has dried, grind it to a powder using a mortar and pestle.
  h. Place the powder into a Buchner funnel again with Whatman #1 filter paper and rinse well with approximately 1 L of RO/DI water.
  i. Transfer again to a heat-resistant vessel and place in the laboratory oven at 80° C.
  j. When the powder has dried, grind it using the mortar and pestle.
2. Resin preparation:
  a. Place 200 mL of Lewatit S8227 ion exchange resin in a 1 L beaker. Add a large (2") Teflon-coated magnetic stir bar and fill to the 1000 mL mark with RO/DI water.
  b. Place the beaker on a hotplate/stirrer and adjust the mixing speed so that the resin is fully fluidized in the water.
  c. Heat the mixture to 70° C. Monitor the temperature with an accurate thermometer and ensure that the temperature stabilizes at 70° C.
  d. When the temperature has stabilized, add 55 g of the aluminum hydroxycarbonate hydrate powder and 2 g of aluminum sulfate powder.
  e. Allow to react for a minimum of five hours at the elevated temperature.
  f. After five hours, turn off the heat and allow the mixture to cool. Continue stirring. When the beaker is cooled to room temperature, cover it with Parafilm and allow to react overnight at room temperature.

g. When the reaction time is complete, remove the beaker from the stir plate and pour the contents through a basket made from 60 mesh steel screen.

h. Remove the magnetic stir bar and rinse the resin for several minutes with copious RO/DI water.

i. Transfer the resin into a heat-resistant vessel (either glass beaker or aluminum tray) and place in a laboratory oven at 70° C.

j. Dry until the moisture content reaches ~15%, stirring every 15 minutes.

Example 3: Spectrophotometric Testing of Calcium Levels in Solution

A saturated calcium solution was prepared according to the following protocol:

1. Weigh 5 g of solid calcium hydroxide into a 1000 mL beaker. Add a 2" Teflon-coated magnetic stir bar and fill with RO water up to the 1000 mL mark.
2. Place the beaker on a stir plate and set the rate of stirring such that the solid calcium hydroxide is fluidized. Allow to stir for ten minutes.
3. Bubble carbon dioxide gas through the solution at a rate of 1000 mL/min for 1.5 minutes (scale reading on rotameter should be "15"). Use a glass stirring rod to hold the air stone at the bottom of the beaker.
4. Turn the gas off by closing the cylinder and remove the air stone from the beaker. Place it in another beaker of RO water. Remove the beaker from the stir plate. Remove the magnetic stir bar and cover the beaker with Parafilm.
5. Allow the beaker to sit undisturbed until the solid material has settled and the supernatant liquid is clear (this may take several hours).

The saturated calcium solutions prepared as described above are used to assess the performance of the scale-control resin according to the following protocol:

1. Weigh 10 g of the dry resin into a 100 mL beaker and add 80 mL of RO water. Add a 1" Teflon-coated magnetic stir bar and place on a stir plate.
2. Set stir rate such that resin is fluidized in the water and stir for 20 minutes.
3. After 20 minutes, stop stirring and remove magnetic stir bar (use another magnetic stir bar to draw original one up the side of the beaker and then grab it).
4. Carefully decant as much of the water as possible from the beaker leaving the resin behind. Rinse the resin three times with RO water from the tap, decanting each time, and set the beaker aside.
5. Label two clean 250 mL beakers as follows:
   i. Ca solution—filtered
   ii. Ca solution—exposed and filtered
6. Place a 0.2 um Millipore nylon membrane filter in a clean Naglene filter holder and assemble the holder. Attach the holder to a clean, dry 500 mL filter flask and attach the hose to the aspirator on the sink tap.
7. Open the tap to start the suction. Filter a 200 mL portion of the calcium standard solution (again using the 60 mL plastic syringe several times to transfer enough solution). When the filtration is done, close the tap and remove the filter holder from the top of the flask. Transfer the filtrate into the beaker labeled "Ca solution—filtered". Cover the beaker with Parafilm.
8. Assemble a second Nalgene filter holder, placing another 0.2 um Millipore nylon membrane filter in the holder. Place it on the same filter flask that was just used to filter the "Ca solution—filtered" sample, and attach the hose to the aspirator on the sink tap.
9. Transfer the resin from the 100 mL beaker into the Nalgene filter holder using RO water in a wash bottle.
10. Open the tap to start the suction. Filter until no more water comes off the beads.
11. Rinse the beads with a 50 mL portion of the liquid from the "Ca solution—filtered" beaker. (Use the 100 mL graduated cylinder to measure this. Be sure to rinse the cylinder with a portion of the solution to be measured prior to performing the measurement.) Filter until no more liquid comes off the beads.
12. Stop the suction and remove the entire filtration assembly from the flask. Transfer it to a second, clean and dry 500 mL filter flask and attach the hose to the aspirator.
13. Start the suction and filter a 100 mL portion of the liquid from the "Ca solution—filtered" beaker (measured using the graduated cylinder). When the filtration is done, close the tap and remove the filter holder from the top of the flask. Transfer the filtrate into the beaker labeled "Ca solution—exposed and filtered". Cover the beaker with Parafilm.
14. Label two clean 250 mL volumetric flasks the same as the two 250 mL beakers.
15. Dilute a 0.5 mL portion of each of the two samples from the 250 mL beakers into a corresponding volumetric flask. Perform the dilution accurately, using a Hach Tensette pipettor set to 0.5 mL. Use one tip for the "Ca solution—filtered" sample and another tip for the "Ca solution—exposed and filtered" sample.
16. Assay the two samples for calcium and magnesium content using a spectrophotometer.

Levels of calcium and magnesium in solution were assayed using an indicator dye with a Hach DR-5000 Spectrophotometer. Briefly, the assay uses a calmagite indicator dye, which forms a purplish-blue color in a strongly alkaline solution and changes to red when it reacts with free calcium or magnesium. Calcium and magnesium determinations are made by chelating calcium with EGTA to destroy any red color due to calcium and then chelating the calcium and magnesium with EDTA to destroy the red color due to both calcium and magnesium. By measuring the red color in the different states, calcium and magnesium concentrations are determined. Test results are measured at 522 nm. The percent reduction in calcium content can be determined by subtracting the result for the exposed Ca solution treated with resin from the result for the corresponding standard filtered Calcium solution, dividing by the result for the corresponding standard filtered Calcium solution and multiplying by 100.

Example 4: Effect of Resin Drying and Moisture Content on Calcium Precipitation Activity The effect of the drying step after preparation of the resin was investigated. Calcium-functionalized resins prepared according to Example 1 were subjected to different drying times and measured for moisture content before being assayed for their ability to precipitate scale. The precipitation activity of the resins was assessed according to protocol set out in Example 3.

As shown in FIG. 1, drying the resin to a moisture content of less than 50%, or to a moisture content of less than 40%, 30%, 20% and in some cases to a moisture content of about 15% prior to use resulted in a significant increase in the observed amount of calcium reduction.

Example 5: Analysis of an Aluminum-Ion Functionalized Weak-Acid Resin and Estimation of Scale-Control Efficiency The resin produced in Example 2 consisting of an aluminum-functionalized weak-acid resin was subject to scale-control testing. Scale-control testing was performed according to the protocol set out in Example 3. The test was repeated three times on the same sample of resin to investigate the change in chemistry of the precipitated mineral. To do this, the precipitated crystals formed during the passage of high scale-potential water through the resin were subjected to scanning electron microscopy (SEM) and energy dispersive X-ray analysis. In this case, the chemical composition of the precipitated particles can be assayed by X-ray spectroscopy using the electron beam of the SEM.

The results demonstrate that the precipitated particles formed during the initial test are composed of nearly pure aluminum-based mineral (FIG. 3) and these crystals appear to consist of relatively large aluminum carbonate or aluminum hydroxycarbonate particles. As shown in FIG. 3, X-ray spectroscopy on the precipitated particles also showed a large peak corresponding to aluminum and only a minor peak corresponding to calcium.

In the second test, a distinct mixture of crystals was formed consisting of what appeared to be aluminum mineral precipitated crystals mixed with much finer calcium carbonate crystals.

The third test produced essentially pure calcium carbonate crystals with no significant evidence of aluminum-based precipitate (see FIG. 4). X-ray spectroscopy also showed that the precipitate no longer contained the large peak corresponding to aluminum, but rather a much larger peak corresponding to calcium (FIG. 5).

The measured scale-control efficiency of the resin during these three tests was 49.5% in the first assay, 47.6% in the second assay, and 43.7% in the third assay. Overall, there appeared to be a modest decline in the resin's capacity to cause precipitation of a calcium-based high scale potential solution as the resin transitioned from one of being aluminum functionalized to one of being calcium functionalized, but this change in performance was small.

The test results using aluminum-functionalized resin treating a calcium-rich high scale potential liquid indicate that the aluminum within the resin exchanges with calcium in the solution and causes the precipitation of what is observed to be nearly pure aluminum carbonate or aluminum hydroxy-carbonate.

In subsequent treatment steps, calcium systematically replaces the aluminum in the precipitate formed during the treatment of the liquid and eventually the precipitate becomes essentially pure calcium carbonate crystals. No significant change in the efficiency of the resin for causing the precipitation of scale-causing minerals was observed during the transition from an aluminum-based resin to a calcium-based resin. It can be concluded that these new resins tend to treat the scale-causing liquid through an ion-exchange mechanism and not through catalysis.

In addition, the resins do not serve as a source of "seed crystal" or as a catalytic surface for the formation of scale crystals. Instead, the phenomenon appears to be the result of an extremely concentrated source of counter-ions in the heat-treated resin causing an electric double layer collapse of the scale-causing mineral into crystals that are formed adjacent to the resin surface.

Because this phenomenon occurs in the electric double layer and not at the resin surface, the crystals so formed are not attached or intercalated to the resin and can be hydrodynamically swept away from the surface once they grow and extend into the shear field of the surrounding liquid. As such, the resins described herein appear to be the result of the treatment of the resin by a multivalent counter-ion (calcium, aluminum, etc.) and through the reaction to subsequent heat treatment, which causes the resin to collapse to a more compact state.

While the above description provides examples of one or more methods, uses, and/or apparatuses, it will be appreciated that other methods, uses, and/or apparatuses may be within the scope of the present description as interpreted by one of skill in the art.

The invention claimed is:

1. A method of producing a scale-control resin comprising combining in an aqueous solution a hydrogen-functionalized weak-acid cation-exchange resin, a weak-acid anion mineral or salt having a multivalent cation, and a strong-acid salt having the same multivalent cation as the weak-acid anion mineral or salt, wherein ions are exchanged between the resin and the weak-acid anion mineral or salt by a catalyzed reaction to produce the scale-control resin that is multivalent cation-functionalized.

2. The method of claim 1, wherein during the catalyzed reaction the aqueous solution of the weak-acid cation-exchange resin, the weak-acid anion mineral or salt, and the strong-acid salt having the same multivalent cation as the weak-acid anion mineral or salt is heated.

3. The method of claim 2 wherein during the catalyzed reaction the aqueous solution of the weak-acid cation-exchange resin, the weak-acid anion mineral or salt, and the strong-acid salt having the same multivalent cation as the weak-acid anion mineral or salt is heated to a temperature between 50 and 100° C.

4. The method of claim 2 wherein the combination of the aqueous solution of the weak-acid cation-exchange resin, the weak-acid anion mineral or salt, and the strong-acid salt having the same multivalent cation as the weak-acid anion mineral or salt is heated to a temperature between 70 and 90° C.

5. The method of claim 1 further comprising drying the scale-control resin to a moisture content selected to increase the scale control efficiency of the scale-control resin.

6. The method of claim 5, wherein the scale-control resin is dried to a moisture content of less than 50%.

7. The method of claim 5, wherein the scale-control resin is dried to a moisture content of between 5 and 20%.

8. The method of claim 1 wherein the weak-acid anion mineral or salt comprises calcium carbonate.

9. The method of claim 1 wherein the strong-acid salt comprises calcium chloride.

10. The method of claim 1 wherein the weak-acid anion mineral or salt comprises aluminum hydroxycarbonate hydrate.

11. The method of claim 1 wherein the strong-acid salt comprises aluminum sulfate.

12. The method of claim 1, wherein the weak-acid anion mineral or salt comprises an anion selected from the group consisting of carbonate and bicarbonate.

13. The method of claim 1 wherein the strong-acid salt comprises an anion selected from the group consisting of chloride, sulfate, nitrate, bromide, iodide and perchlorate.

14. The method of claim 1, wherein the weak-acid anion mineral or salt is added in stoichiometric excess as compared to the cation-exchange capacity of the cation-exchange resin.

15. The method of claim 1, wherein a less than stoichiometric quantity of the strong-acid salt as compared to the weak-acid anion mineral or salt is added to the aqueous solution.

16. The method of claim 1, wherein a less than stoichiometric quantity of the strong-acid salt as compared to the cation-exchange capacity of the cation-exchange resin is added to the aqueous solution.

17. The method of claim 1, wherein the producing the scale-control resin is without the use of a strongly alkaline ingredient.

18. A method for precipitating an ionic substance in a liquid comprising
contacting a scale-control resin produced by the method recited in claim 1 with the liquid and
precipitating the ionic substance in the liquid through an exchange of multivalent cations between the scale-control resin and the liquid, wherein the precipitated ionic substance remains as a stable particle in the liquid.

19. The method of claim 18 further comprising periodically heat-treating the scale-control resin.

20. The method of claim 19 wherein the heat-treating includes rinsing the scale-control resin with hot water.

21. The method of claim 19 wherein an immersion heater and timer are used to perform the periodic heat treatment of the scale-control resin.

22. The method of claim 18, further comprising removing multivalent ions from the liquid.

23. The method of claim 22 wherein the removal of multivalent ions is downstream from the scale-control resin.

24. The method of claim 22, wherein the removal of multivalent ions includes reverse osmosis.

25. The method of claim 22, wherein the removal of multivalent ions includes water softening.

26. The method of claim 22, further comprising a second removal of multivalent ions from the liquid.

27. The method of claim 26, wherein approximately 70% of the multivalent cations are precipitated using the scale-control resin prior to the additional removal of multivalent ions from the liquid.

28. A method of controlling scale formation in equipment from a liquid for the equipment, the method comprising the steps of:
producing a scale-control resin by combining in an aqueous solution a hydrogen-functionalized weak-acid cation-exchange resin, a weak-acid anion mineral or salt having a multivalent cation, and a strong-acid salt having the same multivalent cation as the weak-acid anion mineral or salt, wherein ions are exchanged between the resin and the weak-acid anion mineral or salt by a catalyzed reaction to produce a scale-control resin that is multivalent cation-functionalized; and
contacting the liquid with the scale-control resin to precipitate scale-forming ions or minerals as stable particles that no longer have a significant tendency to attach to downstream surfaces in the equipment.

29. The method of claim 28, wherein during the step of producing the scale-control resin creating a reaction mixture so that the catalyzed reaction is driven to completion through reaction of hydronium ions with the weak-acid anion mineral or salt that suppresses the hydronium ions in the reaction mixture.

30. The method of claim 29, further comprising a step of allowing carbon dioxide gas to leave the reaction mixture.

31. The method of claim 28, wherein during the step of producing a scale-control resin the scale-control resin is converted to a multivalent activated form from an original hydrogen ion form through an initial reaction of hydronium ion with the strong-acid salt and where the weak-acid anion mineral or salt suppresses accumulation of the hydronium ions in the reaction mixture.

32. The method of claim 28, wherein the producing the scale-control resin is without the use of a strongly alkaline ingredient.

* * * * *